United States Patent
Heber et al.

(10) Patent No.: US 7,864,552 B2
(45) Date of Patent: Jan. 4, 2011

(54) INTELLIGENT SENSORLESS CONTROL OF A PHASE CONTROLLED RECTIFIER

(75) Inventors: Brian P. Heber, Delaware, OH (US);
Xian Chen, Lewis Center, OH (US);
Paul Taylor, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 321 days.

(21) Appl. No.: 12/209,572

(22) Filed: Sep. 12, 2008

(65) Prior Publication Data

US 2010/0067269 A1    Mar. 18, 2010

(51) Int. Cl.
*H02H 7/125*    (2006.01)
*H02M 7/68*    (2006.01)

(52) U.S. Cl. .............................. 363/52; 363/53; 363/84; 363/86; 363/89; 363/114

(58) Field of Classification Search .................. 363/52, 363/53, 84, 86, 89, 114
See application file for complete search history.

(56) References Cited

U.S. PATENT DOCUMENTS

| | | | | |
|---|---|---|---|---|
| 4,012,682 A | * | 3/1977 | Carroll et al. ................. | 363/37 |
| 5,384,528 A | * | 1/1995 | Leowald et al. ............. | 323/209 |
| 5,534,766 A | * | 7/1996 | Bonissone et al. .......... | 323/235 |
| 5,652,485 A | * | 7/1997 | Spiegel et al. ................ | 318/147 |
| 6,917,124 B2 | * | 7/2005 | Shetler et al. ................. | 307/66 |
| 2003/0048006 A1 | * | 3/2003 | Shelter et al. ................. | 307/64 |

* cited by examiner

*Primary Examiner*—Bao Q Vu
(74) *Attorney, Agent, or Firm*—Harness, Dickey & Pierce, P.L.C.

(57) ABSTRACT

An uninterruptible power supply ("UPS") has a phase-controlled rectifier coupled to a source of AC power and having an output providing a DC bus, the output of the phase-controlled rectifier coupled to an inverter. A first controller generates a firing angle for the rectifier and a fuzzy logic controller generates a firing angle for the rectifier. In an aspect, the rectifier is controlled by the firing angle generated by the first controller during normal operating conditions of the UPS and the rectifier is controlled by the firing angle generated by the fuzzy logic controller during abnormal operating conditions of the UPS. The abnormal operating conditions can include loss of a direct DC bus voltage measurement and or a period of time after the UPS experiences a large load change. In an aspect, the firing angle generated by the first controller is compared to the firing angle generated by the fuzzy logic controller and a rectifier fault condition determined to exist when the two firing angles differ by at least a threshold amount. In an aspect, the first controller is a PI controller.

21 Claims, 6 Drawing Sheets

| Firing Angle | Total Output % KW | | | | |
|---|---|---|---|---|---|
| | Zero | Small | Medium | Large | X-Large |
| Input Voltage % V | 0 | 25 | 50 | 75 | 100 |
| LB | 90 | Large | Medium | Small | Small | Zero |
| SB | 95 | Large | Medium | Small | Small | Small |
| N | 100 | Large | Medium | Medium | Medium | Small |
| SA | 105 | Large | Large | Medium | Medium | Medium |
| LA | 110 | X-Large | Large | Medium | Medium | Medium |

| Firing Angle | |
|---|---|
| Zero | 0 |
| Small | 20 |
| Medium | 40 |
| Large | 60 |
| X-Large | 80 |

| | | Total Output % KW | |
|---|---|---|---|
| | | Small | Medium |
| Input Voltage % V | | 25 | 50 |
| SB | 95 | Medium | Small |
| N | 100 | Medium | Medium |

| Firing Angle | | Total Output % KW | | | | | | |
|---|---|---|---|---|---|---|---|---|
| | | Zero | Small | Small - Medium | Medium | Medium-Large | Large | X-Large |
| | | 0 | 20 | 40 | 60 | 80 | 100 | 120 |
| Input Voltage (%) | | | | | | | | |
| XLB | 76 | Fcenter1 | Fcenter1 | Fcenter1 | Fcenter1 | Fcenter1 | Fcenter1 | Fcenter1 |
| LB | 80 | Fcenter13 | Fcenter1 | Fcenter1 | Fcenter1 | Fcenter1 | Fcenter1 | Fcenter1 |
| MLB | 84 | Fcenter16 | Fcenter5 | Fcenter1 | Fcenter1 | Fcenter1 | Fcenter1 | Fcenter1 |
| MB | 87 | Fcenter18 | Fcenter9 | Fcenter3 | Fcenter1 | Fcenter1 | Fcenter1 | Fcenter1 |
| SB | 90 | Fcenter19 | Fcenter12 | Fcenter6 | Fcenter3 | Fcenter1 | Fcenter2 | Fcenter1 |
| XSB | 92 | Fcenter20 | Fcenter13 | Fcenter9 | Fcenter5 | Fcenter4 | Fcenter4 | Fcenter3 |
| SSB | 95 | Fcenter21 | Fcenter14 | Fcenter11 | Fcenter9 | Fcenter7 | Fcenter6 | Fcenter5 |
| VN | 100 | Fcenter22 | Fcenter16 | Fcenter13 | Fcenter11 | Fcenter10 | Fcenter9 | Fcenter8 |
| SA | 105 | Fcenter23 | Fcenter18 | Fcenter15 | Fcenter13 | Fcenter12 | Fcenter11 | Fcenter10 |
| MA | 110 | Fcenter24 | Fcenter19 | Fcenter17 | Fcenter15 | Fcenter13 | Fcenter13 | Fcenter12 |
| LA | 115 | Fcenter25 | Fcenter20 | Fcenter18 | Fcenter16 | Fcenter15 | Fcenter14 | Fcenter13 |

Fig-9

DC Bus Voltage Waveform for 480V 250KVA 60Hz UPS
with No Fuzzy Logic Controller

*Fig-10*

DC Bus Voltage Waveform for 480V 250KVA 60Hz UPS
with Open-Loop Fuzzy Logic Controller

*Fig-11*

INTELLIGENT SENSORLESS CONTROL OF A PHASE CONTROLLED RECTIFIER

FIELD

The present disclosure relates to control of a phase controlled rectifier, such as used in uninterruptible power supplies (UPS's).

BACKGROUND

This section provides background information related to the present disclosure which is not necessarily prior art.

Figure 1:
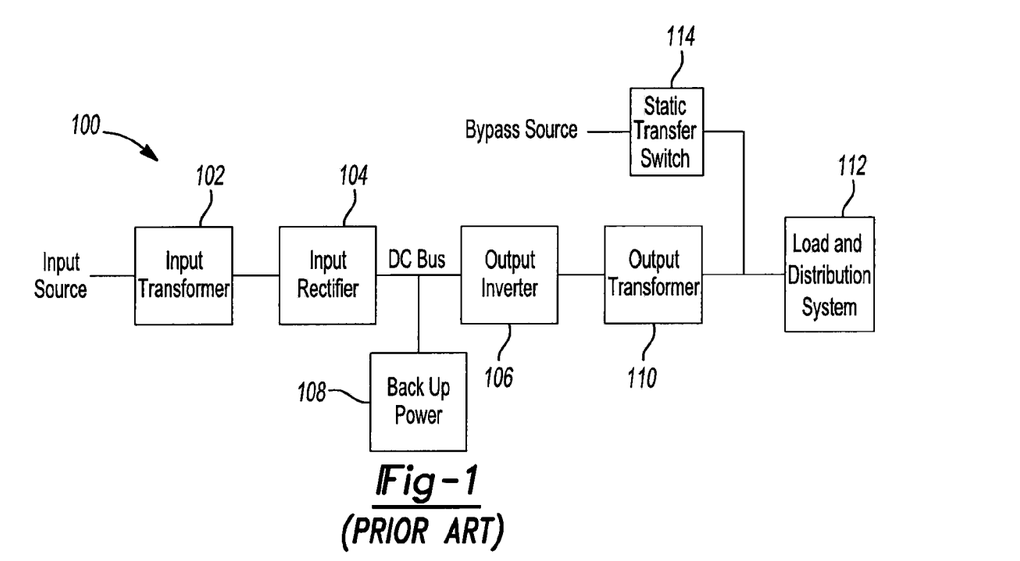
FIG. 1 is a block diagram of a prior art UPS.

A typical high power UPS 100, such as shown in FIG. 1, typically has a fully rated isolated input transformer 102 having a primary to which a power feed from a utility substation is coupled. The input transformer 102 has a secondary for each rectifier 104 of the UPS. Each secondary is coupled to an input of a respective rectifier 104 and an output of each rectifier 104 is coupled to an input of an inverter 106. There may be a single inverter to which all the rectifiers are coupled, or there may be an inverter for each rectifier. The back-up power source 108, such as a battery bank, is also typically coupled to the input of the inverter(s) 106. An output of the inverter(s) 106 is coupled to a primary of a fully rated output transformer 110, and the secondary of the output transformer 110 is coupled to the power distribution system 112 of the facility. The output transformer 110 typically boosts the voltage from the inverter 106 to the desired output voltage, such as 480 VAC. A bypass switch 114, when closed, bypasses the UPS and connects the facility's power distribution system directly to a bypass source, such as to the power feed from the utility substation.

In order to control the DC voltage in a phase controlled inverter, such as a rectifier of a UPS, the DC voltage must be measured as a feedback signal. If this measurement fails (e.g., open circuited or shorted circuited), the controller will "choose" the wrong firing angle. Hence, the DC voltage will decrease rapidly to zero or increase rapidly potentially causing damage to the components. In an uninterruptible power supply ("UPS") application, the critical bus (the output bus of the UPS) would be forced onto battery until that energy source is depleted at which time the critical bus will be transferred to the unconditioned, unpredictable utility source.

The existing firing angle control of the rectifier of a UPS uses a Proportional+Integral (PI) controller. The transient response of this controller allows for large over and under shoots when the load changes (without a battery source connected.). When a big load hit happens, DC bus voltage will decrease severely and may cause DC bus under-voltage. When a load dump happens, DC bus will increase rapidly and may cause DC bus over-voltage. Both cases will shut down the rectifier.

In UPS applications, some rectifier faults (e.g. SCR short, SCR drive board fail, etc.) are difficult to detect due to limited measurements that are available.

SUMMARY

This section provides a general summary of the disclosure, and is not a comprehensive disclosure of its full scope or all of its features.

In accordance with an aspect of the present disclosure, the DC Bus voltage of a phase controlled rectifier is controlled without directly measuring the DC Bus voltage. Instantaneous measurements of the output power of the UPS and input line voltage are input to a fuzzy logic controller. The fuzzy logic controller uses those inputs to select a firing angle that will maintain the DC voltage of the DC bus at a suitable level.

In a UPS application, the result is that the critical bus stays powered by a conditioned and uninterruptible source with a failed DC bus voltage measurement.

In an aspect, an open loop fuzzy logic controller is used to select a firing angle at which to fire the switching devices of the rectifier to keep DC voltage on the DC bus at a suitable level. The invention uses fuzzy logic to choose a firing angle based on output power and input line voltage, eliminating the needs for a DC bus voltage measurement.

In an aspect, a firing angle generated by a fuzzy logic controller is compared with a firing angle generated by a PI (proportional-integral) controller to determine if there is a fault condition with the rectifier. If the firing angles differ by more than a threshold, it is determined that a rectifier fault condition exists.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Corresponding reference numerals indicate corresponding parts throughout the several views of the drawings.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

In accordance with an aspect of the present disclosure, the DC Bus voltage of a phase controlled rectifier is controlled without directly measuring the DC bus voltage. Instantaneous measurements of the output power of the UPS and input line voltage are input to a fuzzy logic controller. The fuzzy logic controller uses those inputs to select a firing angle that will maintain the DC voltage of the DC bus at a suitable level. In a UPS application, the result is that the critical bus stays powered by a conditioned and uninterruptible source with a failed DC bus voltage measurement.

In an aspect, an open loop fuzzy logic controller is used to select a firing angle at which to fire the switching devices of the rectifier to keep DC voltage on the DC bus at a suitable level. The invention uses fuzzy logic to choose a firing angle based on output power and input line voltage, eliminating the needs for a DC bus voltage measurement.

In an aspect, a firing angle generated by a fuzzy logic controller is compared with a firing angle generated by a PI controller to determine if there is a fault condition with the rectifier. If the firing angles differ by more than a threshold, it is determined that a rectifier fault condition exists.

Figure 2:
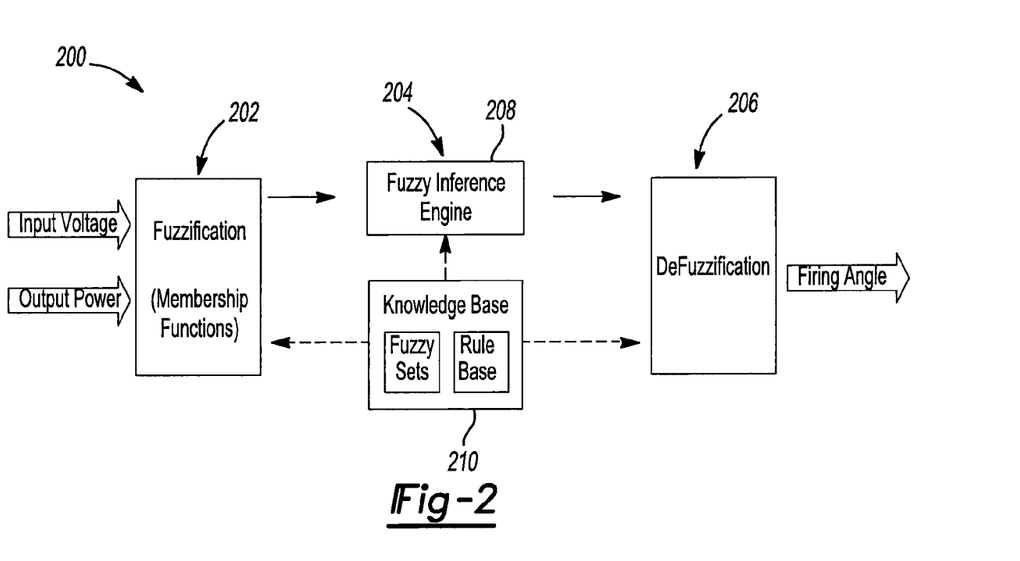
FIG. 2 is a block diagram of a fuzzy logic control system in accordance with an aspect of the present disclosure.

A block diagram for a fuzzy logic control system 200, which may also be referred to herein as fuzzy logic controller 200, according to an aspect of the present disclosure is shown in FIG. 2. Fuzzy logic control system 100 includes three main aspects shown by blocks 202, 204, 206: fuzzification according to membership functions at 202, fuzzy inference based on fuzzy sets and rule base at 204 (which includes fuzzy inference engine 208 and knowledge base 210), and defuzzification at 206. Input voltage, such as the input voltage to a UPS, and output power, such as the output power of the UPS, are inputs to fuzzification at 202. The UPS may be, by way of example and not of limitation, UPS 100 shown in FIG. 1. Defuzzification 206 provides firing angle as an output, such as a firing angle at which to fire switching devices of a phase controlled rectifier. Fuzzy logic control system 200 may illustratively be implemented in a module such as an Application Specific Integrated Circuit (ASIC), an electronic circuit, a processor (shared, dedicated, or group) and memory that execute one or more software or firmware programs (such as by way of example and not of limitation, a microcontroller or microcomputer), a combinational logic circuit, a digital signal process (DSP), and/or other suitable components that provide the described functionality.

Fuzzification:

Fuzzification 202 takes place first in fuzzy logic control system 200, which translates input signals into linguistic variables and then maps the input signal to fuzzy sets with a particular degree of certainty according to membership functions.

A linguistic variable for input voltage(%) can be "Large Below Nominal (LB)"=90%, "Small Below Nominal(SB)"=95%, "Nominal(N)"=100%, "Small Above Nominal(SA)"=105% and "Large Above Nominal(LA)"=110%; for total output power(%), linguistic variable can be "Zero"=0%, "Small"=25%, "Medium"=50%, "Large"=75% and "Extra Large"=100%. (The number of linguistic variables is a design choice and the examples described above are simplified examples for ease of illustration).

Figure 3A:
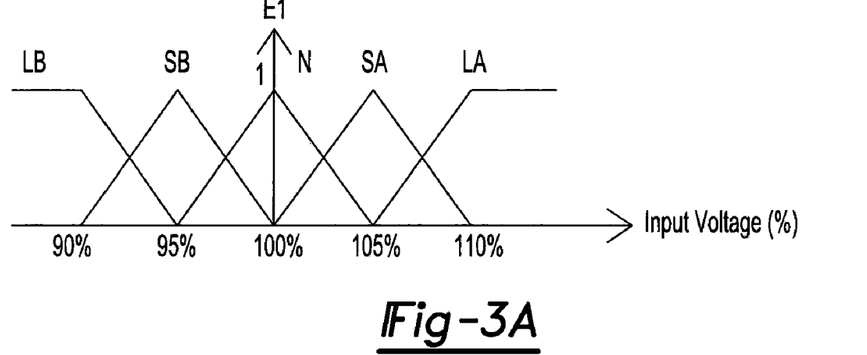
FIGS. 3A and 3B are graphs showing a triangular membership function with linguistic labels for two input signals.
Figure 3B:
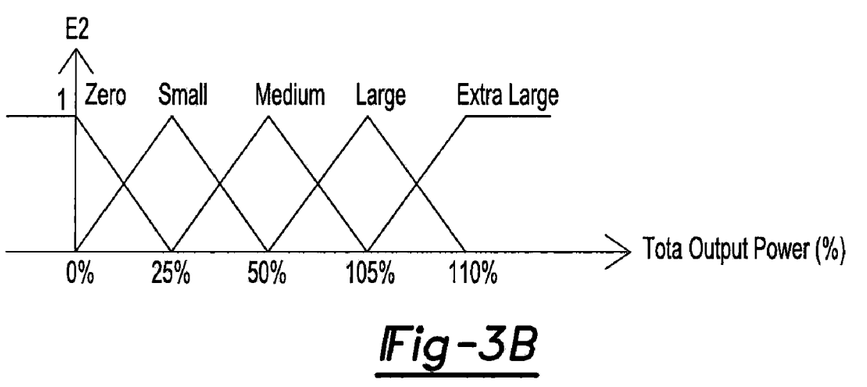

The most popular choices of membership functions include triangular, trapezoidal and bell-shaped functions. Among these the three, triangular-shaped membership function is the most economic one and can be obtained, stored with minimal use of memory and manipulated efficiently in terms of real-time requirements. The triangular-shaped membership function is illustratively used in fuzzification 202 in fuzzy logic control system 200. Once the membership function is selected, each input signal will be mapped on the domain of the corresponding linguistic variable. FIGS. 3A & B show the triangular membership function with linguistic labels for both input signals, i.e. input voltage (E1) (FIG. 3A) and total output power (E2) (FIG. 3B).

Figure 4:
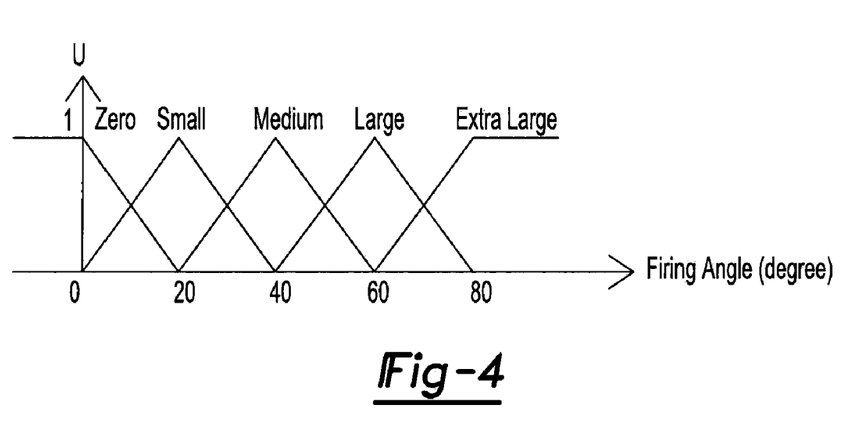
FIG. 4 is a graph showing the mapping of a firing angle on a triangular membership function.

Likewise, the triangular membership function is illustratively used for the fuzzy logic output of fuzzy logic control system 200, i.e. the firing angle. The number of linguistic variables is a design choice. Here, it is simplified to 5 linguistic variables for ease of illustration, "Zero"=0 deg, "Small"=20 deg, "Medium"=40 deg, "Large"=60 deg and "Extra Large"=80 deg. FIG. 4 shows the mapping of the firing angle (U) on a triangular membership function.

Figure 5:
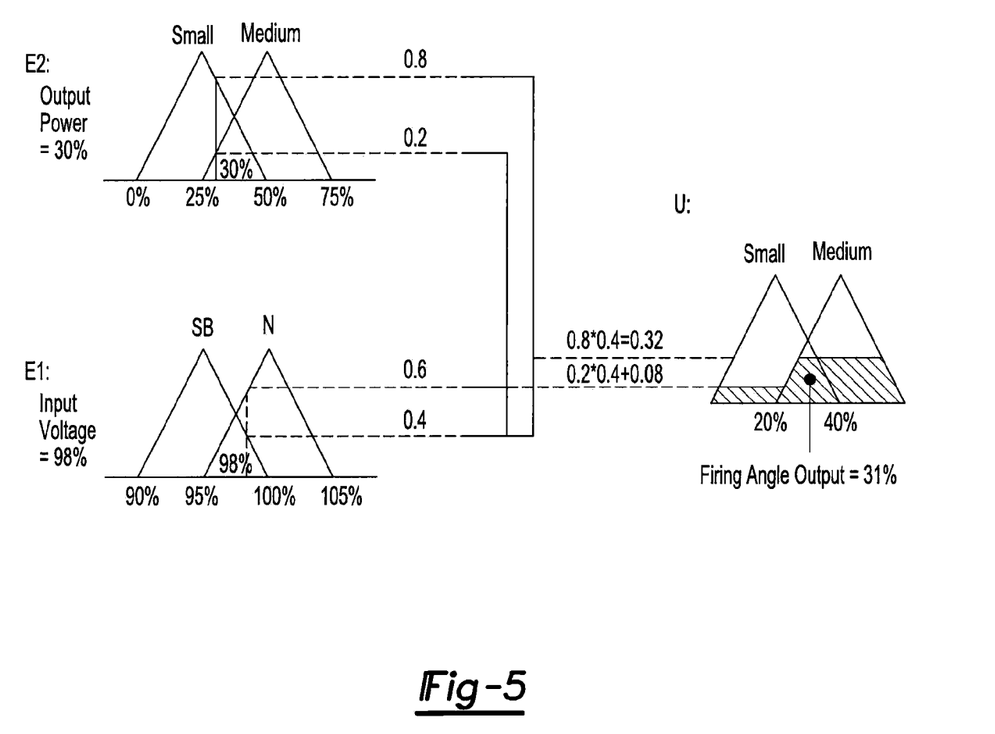
FIG. 5 is a schematic illustration of a fuzzy inference process in accordance with an aspect of the present disclosure.

Once the shape of the membership function is selected and associated with linguistic variables, the fuzzification process can apply. The fuzzification process maps both crisp inputs to linguistic variables with a particular degree of certainty. The degree of certainty is determined by the shape of the membership function. For example, suppose the total output power at sample m is P(m)=30%, the fuzzification might conclude that this crisp value belongs to linguistic variable "Small"=25% with a $$\frac{30\%(P(m)) - 50\%(\text{Medium})}{25\%(\text{Small}) - 50\%(\text{Medium})} = 0.8$$

degree of certainty and to the linguistic variable "Medium"=50% with a (1-0.8)=0.2 degree of certainty, as shown in FIG. 5.

Likewise, suppose the input voltage at sample m is V(m)=98%, the fuzzification might conclude that this crisp value belongs to linguistic variable "Small Below Nominal"=95% with a $$\frac{98\%(V(m)) - 100\%(N)}{95\%(SB) - 100\%(N)} = 0.4$$

degree of certainty and to the linguistic variable "Nominal(N)"=100% with a (1-0.4)=0.6 degree of certainty, as shown in FIG. 5.

Fuzzy Inference Engine and Rule Base:

The inference mechanism uses the fuzzified inputs and checks the knowledge base to determine which rules to fire, i.e. it determines which rules apply. Next, it evaluates each rule and arrives at a conclusion for the output linguistic value for each rule. With reference to the table of FIG. 6, which shows a rule base for fuzzy logic control of the firing angle, for the example highlighted by line 600 in the table of FIG. 6, with a single sample of input voltage and total output power, example rules read:

IF Input Voltage is SB (Small Below Nominal) AND Output Power is Small, THEN Firing Angle is Medium.

IF Input Voltage is SB (Small Below Nominal) AND Output Power is Medium, THEN Firing Angle is Small.

IF Input Voltage is N (Nominal) AND Output Power is Small, THEN Firing Angle is Medium.

IF Input Voltage is N (Nominal) AND Output Power is Medium, THEN Firing Angle is Medium.

Figure 6:
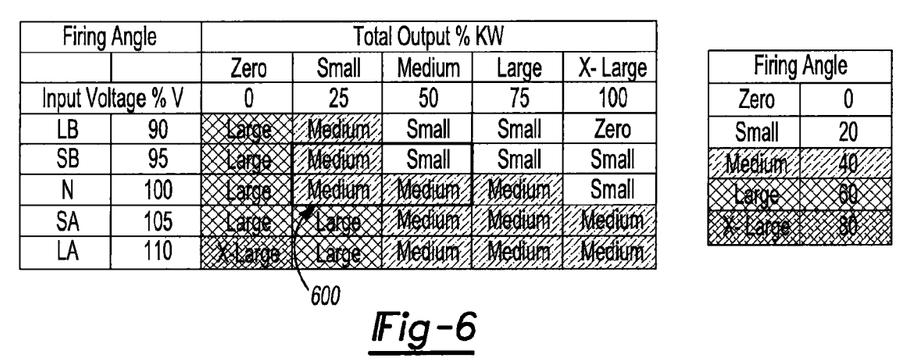
FIG. 6 is a table showing a rule base for fuzzy logic control of a firing angle.
Figure 7:
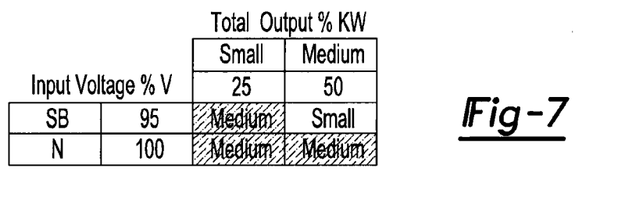
FIG. 7 is a section of the table of FIG. 6 showing the rule base for fuzzy logic control of the firing angle at sample m.

The fuzzy inference engine 208 serves two purposes: i) determines which rules to apply and ii) assigns a level of certainty for each rule fired. The complete IF-THEN rules for the above example are listed in the table of FIG. 6. In this example, four rules are activated each with a degree of certainty. The four rules choose the "fuzzy" firing angle to be "medium" or "small" as shown in the table of FIG. 6 and of FIG. 7 (which shows a rule base for fuzzy logic control of the firing angle at sample m). The fuzzy logic control system 200 then converts the rules, degree of certainty and the fuzzy firing angle to a crisp and continuous firing angle that the rectifier, such as the rectifier of a UPS, can achieve.

Defuzzification:

The process of transforming the overall implied fuzzy set (hatched area in FIG. 5) and linguistic variables (see the table of FIG. 7) to a crisp output value, firing angle output, is called defuzzification. There are many methods which can perform this task, like Center-of-Area/Gravity defuzzification, Center-of-Sums defuzzification, Center-of-Largest-Area defuzzification, etc. Illustratively, Center of Gravity defuzzification(COG) is used to defuzzify the individual implied fuzzy sets and arrive at a crisp output.

COG locates the weighted center of the hatched area in FIG. 5 and then extends a perpendicular line to the horizontal axis corresponding to the range of possible output firing angle values. The intersection is the crisp firing angle output, in this example, thirty-one degrees as shown in FIG. 5. Mathematically, COG is defined as:

$$U = \frac{\sum_{j=1}^{5} c^j \int U(u)du}{\sum_{j=1}^{5} \int U(u)du}$$

Where $c^j$ is the center of each of the output triangle membership functions. The area for each triangle provides the weighting.

Figure 8:
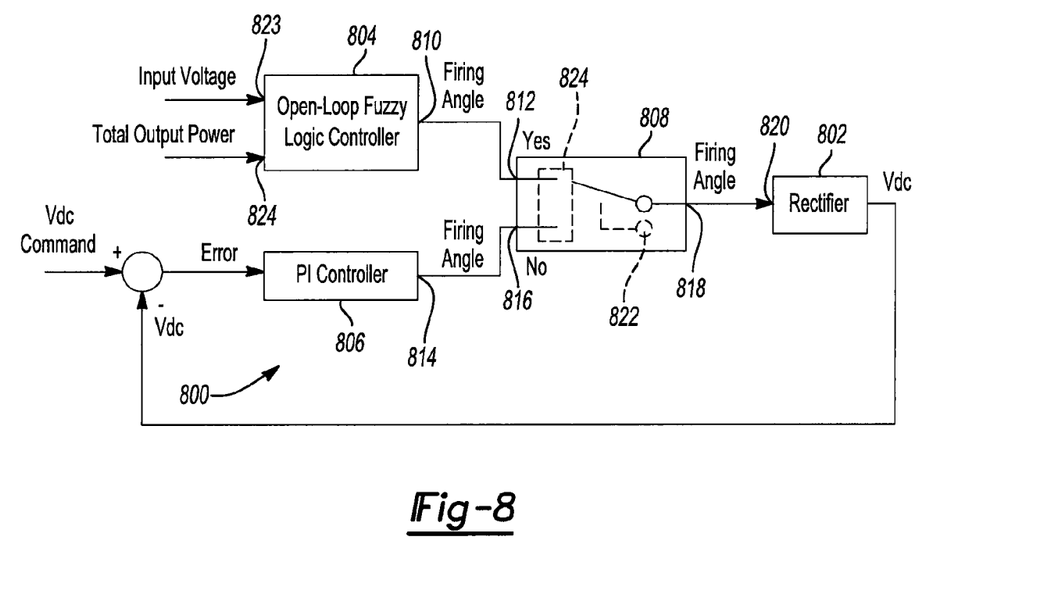
FIG. 8 is a block diagram of a control system for controlling a rectifier of a UPS in accordance with an aspect of the present disclosure.

FIG. 8 is a block diagram of an illustrative embodiment of a control system 800 used to control a phase controlled rectifier 802, such as a rectifier in a UPS. By way of example an not of limitation, control system 800 is used to control rectifier 104 of UPS 100. Control system 800 includes open-loop fuzzy logic controller 804, first controller 806 (which may illustratively be a PI controller and may also be referred to herein as PI controller 806), and switch 808. Output 810 of open-loop fuzzy logic controller is coupled to an input 812 of switch 808 and output 814 of PI controller is coupled to an input 816 of switch 808. An output 818 of switch 808 is coupled to a control input 820 of rectifier 802. In this regard, it should be understood that rectifier 802 may include a plurality of switching devices (not shown), such as MOSFETS, Thyristors or SCRs, and the output 818 of switch 808 would then be coupled to control inputs of the switching devices, such as gates of the MOSFETs, Thyristors or SCRs. In an aspect, fuzzy logic control system 200 comprises fuzzy logic controller 804. In should be understood that first controller 806 can be a controller other than a PI controller, such as by way of example and not of limitation, a proportional ("P") controller, a proportional-integral-derivative ("PID") controller, a "bang-bang" controller, a state feedback controller or a sliding mode controller.

When used in controlling the rectifier of a UPS, such as rectifier 104 of UPS 100, an input indicative of the instantaneous input voltage to the UPS and an input indicative of the instantaneous total output power being provided by the UPS are provided to inputs 823 and 824 of fuzzy logic controller 804. Fuzzy logic controller uses these inputs to generate a firing angle that will maintain the DC voltage of the DC bus at a suitable level without the need for a direct measurement of the DC bus voltage.

Figure 9:
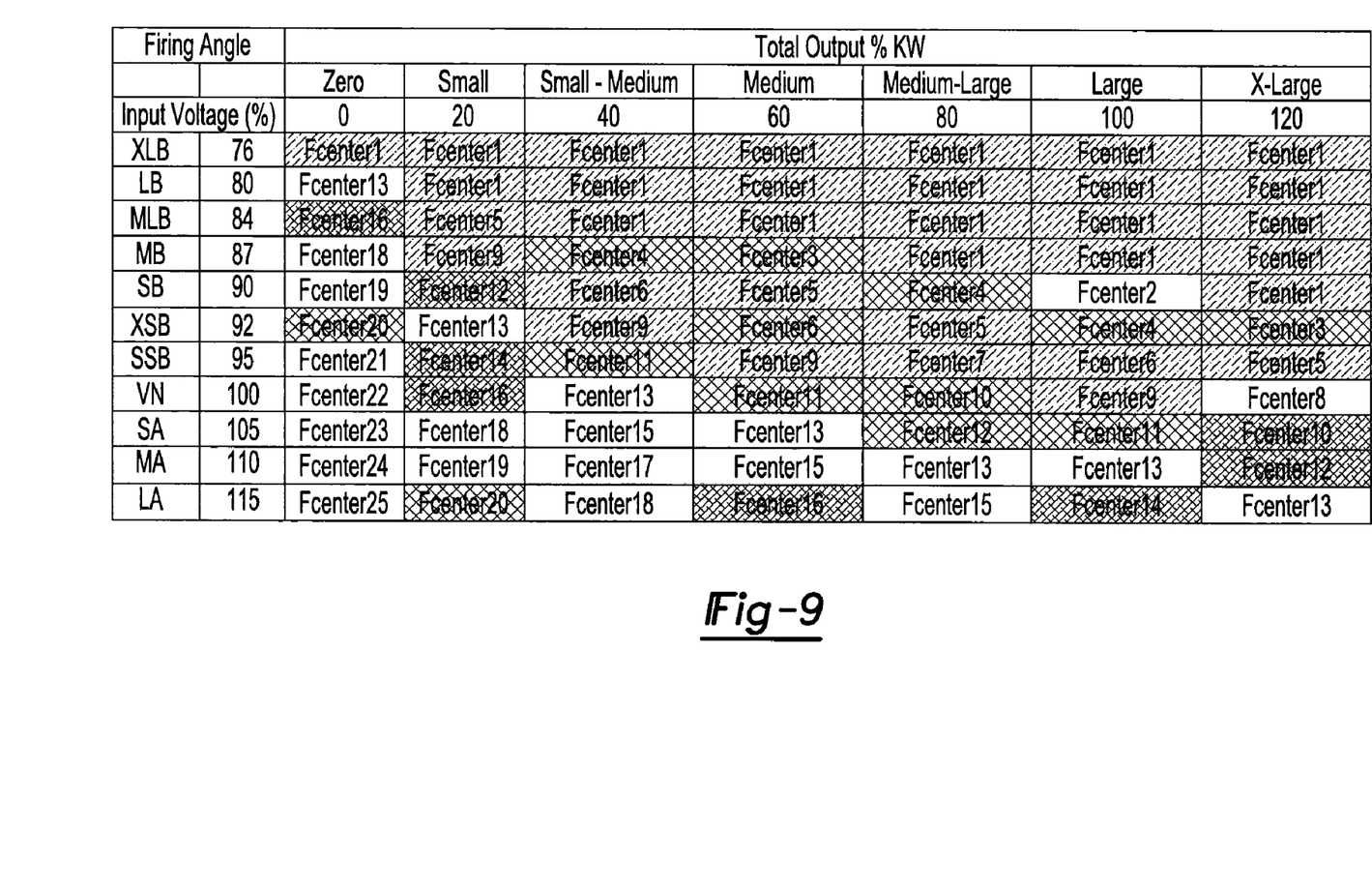
FIG. 9 is a table showing a rule base for a sensorless open-loop fuzzy logic control of a firing angle of a phase controlled rectifier of a UPS in accordance with an aspect of the present disclosure.

The table of FIG. 9 shows an illustrative rule base for a sensorless open-loop fuzzy logic control of the firing angle of a phase controlled rectifier of a UPS in an illustrative embodiment with seven output power linguistic variables, eleven input voltage centers and twenty-five fuzzy output centers (firing angle centers referred to as "Fcenters" in the table of FIG. 9). Illustratively, fuzzy logic controller 804 is implemented in a digital signal processor (DSP) by configuring the DSP to implement the above described fuzzy logic. Though complicated, the accuracy and efficiency of a DSP outweighs the cost of implementing it in a DSP compared to other devices such as a microcontroller.

Loss of DC Bus Voltage Sensor

In the illustrative embodiment of FIG. 8, when the DC bus voltage measurement in a UPS, such as UPS 100 when control system 800 is used to control rectifier 104 of UPS 100, is lost such as due to a failure of DC bus voltage sensor 822, the fuzzy logic output (output of fuzzy logic controller 804) is used as the firing angle to control the rectifier of the UPS and maintain the DC bus at the proper voltage. In this regard, switch 808 is responsive to the DC bus voltage sensor 822. When the DC bus voltage sensor 822 fails, switch 808 couples output 810 of fuzzy logic controller 804 to the control input 820 of rectifier 802. When DC bus voltage sensor 822 is functioning properly, switch 808 couples output 806 of PI controller 806 to control input 820 of rectifier 802.

Fast Transient Response with Load Change

In an aspect of the embodiment of FIG. 8, control system 800 when used to control the rectifier of a UPS combines a traditional PI controller (PI controller 806) with fuzzy logic controller 804 such that when a large load change on the UPS is detected, the output of fuzzy logic controller 804 is used to control the rectifier 802 (such as rectifier 104 of UPS 100) instead of the output of the PI controller 806. This greatly improves the transient response but maintains the steady state accuracy of the PI controller 806. For example, whenever the fuzzy logic controller 804 detects a load change on the UPS greater than a predetermined amount, the output of fuzzy logic controller 804 is used to control the rectifier 802 and the PI controller 806 is frozen (i.e., the integrator value of the PI controller is held constant at the value it had when the control of the rectifier 802 was switched to the fuzzy logic controller 804). After some small period of time, the PI controller 806 is unfrozen and the control of the rectifier 802 switched back to the PI controller 806 so that the output of the PI controller 806 is again used to control the rectifier. The small period of time is illustratively set long enough to allow PI controller 806 to stabilize after the large load change. This technique achieves both a fast transient response and good steady state tracking. In this regard, switch 808 is responsive to the large load change on the UPS and couples output 810 of fuzzy logic controller 804 to control input 820 of rectifier 802 in response to the large load change. After the small period of time, switch 808 decouples the output of fuzzy logic controller 804 from the control input of rectifier 802 and couples the output of PI controller 806 to the control input 820 of rectifier 802. In an aspect, switch 808 is responsive to both a large load change on the UPS and DC bus voltage sensor 822.

Figure 10:
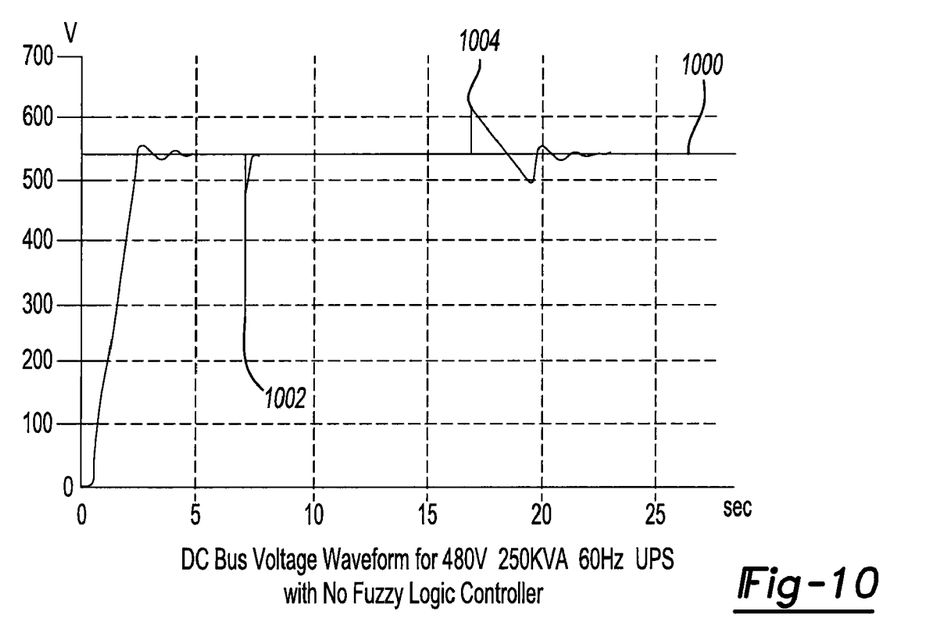
FIG. 10 is a graph showing the DC bus voltage waveform for a UPS without a fuzzy logic controller upon the UPS experiencing a large load change.

FIG. 10 shows the DC bus voltage waveform for 480V 250 KVA 60 Hz UPS system without a fuzzy logic controller (i.e., having the traditional PI controller but not a fuzzy logic controller). Nominal DC bus voltage, line 1000, is at 540V. When a 100% load hits happens at 7s, the DC bus voltage drops down to 280 V (1002) and the rectifier is turned-off due to the DC bus being under-voltage. When a 100% load dump happens at 17s, the DC bus voltage shoots up to 615V (1004)

Figure 11:
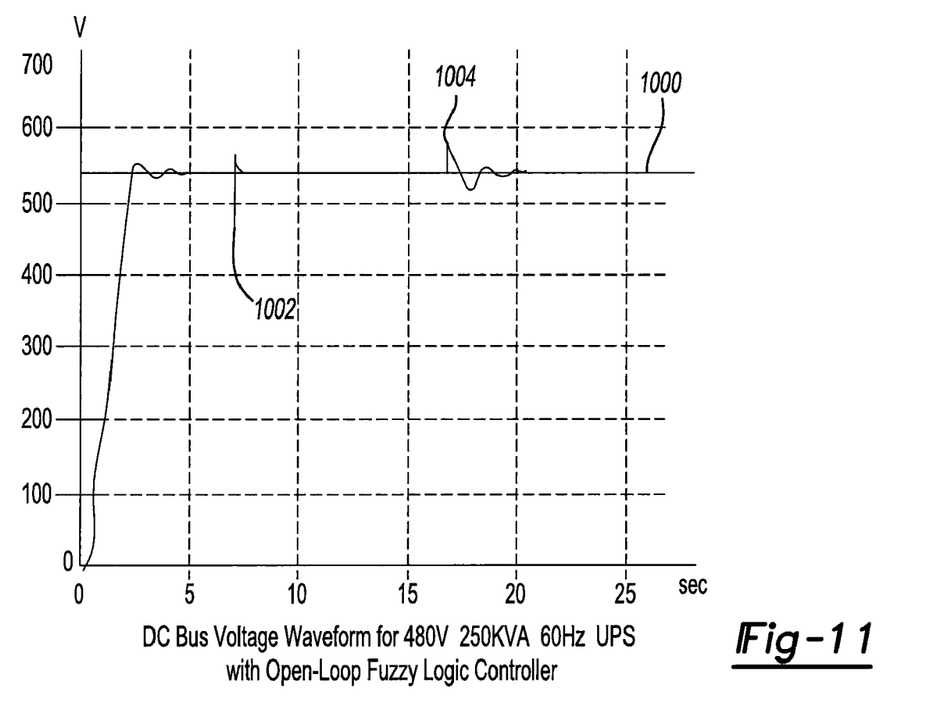
FIG. 11 is a graph showing the DC bus voltage waveform for a UPS having a fuzzy logic controller in accordance with an aspect of the present disclosure upon the UPS experiencing a large load change.

FIG. 11 shows the DC bus voltage waveform for the same UPS modified to add a fuzzy logic controller, such as fuzzy logic controller 804, that implements the above described fuzzy logic. When the 100% load hit happens at 7s, the DC bus voltage only drops down to 470 V, which is above the level at which rectifier shut-down occurs due to a the DC bus voltage being under voltage. When the 100% load dump happens at 17s, the DC bus voltage only shoots up to 580 V.

Rectifier Failure Detection

In an aspect, the firing angle output of the PI controller 806 is compared to the firing angle output of the fuzzy logic controller 804 to detect a faulty rectifier component (e.g., a faulty switching device, such as a faulty MOSFET, of the rectifier). Under a rectifier fault condition, PI controller 806's firing angle will be noticeably different than fuzzy logic controller 804's firing angle. A threshold amount can be determined heuristically. When the firing angle output by PI controller 806 differs from the firing angle output by fuzzy logic controller 804 by at least the threshold, a rectifier fault is determined and an appropriate indication or alarm given, such as illuminating a fault indicator LED or other display, or the like. In this regard, outputs 810 and 814 of fuzzy logic controller 804 and PI controller 806 may illustratively be coupled to a controller 826 (shown in phantom in FIG. 8) that makes this comparison. Controller 826 may be part of switch 808 or separate. Also, controller 826 could be a separate device or it could be included in the same device as first controller 806 or fuzzy logic controller 804 with first controller 806 or fuzzy logic controller 804 programmed appropriately to implement the comparison function of the second controller. In this regard, switch 808 is shown representationally in FIG. 8 and can be any type of device that can couple and decouple the outputs of fuzzy logic controller 804 and first controller 806 to control input 820 of rectifier 802.

In should also be understood that in lieu of switch 808, PI controller 806 could be frozen when the DC bus voltage measurement is lost.

In an aspect, the fuzzy logic controller is used to control the rectifier of a UPS under abnormal operating conditions and the PI controller is used to control the rectifier under normal operating conditions. Abnormal operating conditions include, by way of example and not of limitation, loss of the DC bus voltage measurement and/or a period of time after a large load change on the UPS until the PI controller stabilizes after the large load change.

The fuzzy logic controller is better than a straight look-up table for the firing angle because it provides a continuous firing angle, whereas the look-up table approach would provide discrete steps. These steps will create noticeable changes on the DC Bus voltage, i.e., more ripple.

The combination of the fuzzy logic controller and PI controller combines the good steady state performance of the PI controller (when the DC bus voltage measurement is available) with the fast transient performance of the fuzzy logic controller.

Comparing the firing angle generated by the fuzzy logic controller with the firing angle generated by the PI controller provides an alternative way to detect rectifier defects with limited measurement equipment which is difficult to deal with by traditional methods.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A method of controlling a rectifier in an uninterruptible power supply having a first controller and a fuzzy logic controller, comprising:
   under normal operating conditions controlling the rectifier with the first controller and not the fuzzy logic controller; and
   under abnormal operating conditions controlling the rectifier with the fuzzy logic controller and not the first controller.

2. The method of claim 1 including generating a firing angle for the rectifier with the fuzzy logic controller and the first controller and controlling the rectifier with the fuzzy logic controller or the first controller includes using the firing angle generated by the fuzzy logic controller as the firing angle for the rectifier when controlling the rectifier with the fuzzy logic controller and using the firing angle generated by the first controller as the firing angle for the rectifier when controlling the rectifier with the first controller.

3. The method of claim 2 including controlling the rectifier with the fuzzy logic controller when a DC bus voltage measurement of a DC bus of the UPS is not available and controlling the rectifier with the first controller when the DC bus voltage measurement is available.

4. The method of claim 2 including controlling the rectifier with the fuzzy logic controller for a period of time upon the UPS experiencing a large load change and then controlling the rectifier with the first controller after the period of time.

5. The method of claim 4 wherein the period of time is a period of time that it takes the first controller to stabilize after the UPS experiences the large load change.

6. The method of claim 3 including controlling the rectifier with the fuzzy logic controller for a period of time upon the UPS experiencing a large load change and then controlling the rectifier with the first controller after the period of time.

7. The method of claim 6 wherein the period of time is a period of time that it takes the first controller to stabilize after the UPS experiences the large load change.

8. The method of claim 3 wherein the fuzzy logic controller generates the firing angle for the rectifier based on an input indicative of instantaneous voltage input to the UPS and an input indicative of instantaneous total power output being provided by the UPS.

9. The method of claim 1 wherein controlling the rectifier with the first controller includes controlling it with a PI controller.

10. The method of claim 2 including comparing the firing angle generated by the fuzzy logic controller with the firing angle generated by the first controller and determining that a rectifier fault condition exists when the firing angle generated by the fuzzy logic controller differs from the firing angle generated by the first controller by at least a threshold amount.

11. A method of determining whether a rectifier fault exists in an uninterruptible power supply having a first controller and a fuzzy logic controller, comprising:

generating a firing angle for the rectifier with the fuzzy logic controller and generating a firing angle for the rectifier with the first controller;

comparing the firing angle generated by the fuzzy logic controller with the firing angle generated by the first controller; and determining that a rectifier fault condition exists when the firing angle generated by the fuzzy logic controller differs from the firing angle generated by the first controller by at least a threshold amount.

12. The method of claim 11 wherein generating the firing angle for the rectifier with the first controller includes generating that firing angle with a PI controller.

13. An uninterruptible power supply ("UPS"), comprising:

a phase-controlled rectifier coupled to a source of AC power and having an output providing a DC bus, the output of the phase-controlled rectifier coupled to an inverter;

a first controller that generates a firing angle for the rectifier and a fuzzy logic controller that generates a firing angle for the rectifier; and the rectifier being controlled by the firing angle generated by the first controller during normal operating conditions of the UPS and the rectifier being controlled by the firing angle generated by the fuzzy logic controller during abnormal operating conditions of the UPS.

14. The apparatus of claim 13, and further including a switch that couples the firing angle generated by the first controller to a control input of the rectifier during normal operating conditions of the UPS and that couples the firing angle generated by the fuzzy logic controller to the control input of the rectifier during abnormal operating conditions of the UPS.

15. The apparatus of claim 13 wherein the abnormal operating conditions include loss of a direct measurement of a voltage of the DC bus.

16. The apparatus of claim 15 wherein the fuzzy logic controller generates the firing angle for the rectifier based on an input indicative of instantaneous voltage input to the UPS and an input indicative of instantaneous total power output being provided by the UPS.

17. The apparatus of claim 13 wherein the abnormal operating conditions include a period of time after the UPS experiences a large load change wherein the period of time is a time that it takes the first controller to stabilize after the large load change.

18. The apparatus of claim 13 wherein the first controller is PI controller.

19. The apparatus of claim 13 including a second controller that compares the firing angle generated by the first controller with the firing angle generated by the fuzzy logic controller and determines that a rectifier fault exists when the firing angle generated by the first controller differs from the firing angle generated by the second controller by at least a threshold amount.

20. An uninterruptible power supply ("UPS"), comprising:

a phase-controlled rectifier coupled to a source of AC power and having an output providing a DC bus, the output of the phase-controlled rectifier coupled to an inverter;

a first controller that generates a firing angle for the rectifier and a fuzzy logic controller that generates a firing angle for the rectifier; and a second controller that compares the firing angle generated by the first controller with the firing angle generated by the fuzzy logic controller and determines that rectifier fault condition exists when the firing angle generated by the first controller differs from the firing angle generated by the fuzzy logic controller by at least a threshold amount.

21. The apparatus of claim 20 wherein the first controller is a PI controller.

* * * * *